Feb. 14, 1933.    L. SCHWITZER ET AL    1,897,280
SHAFT SEAL
Filed Dec. 17, 1931
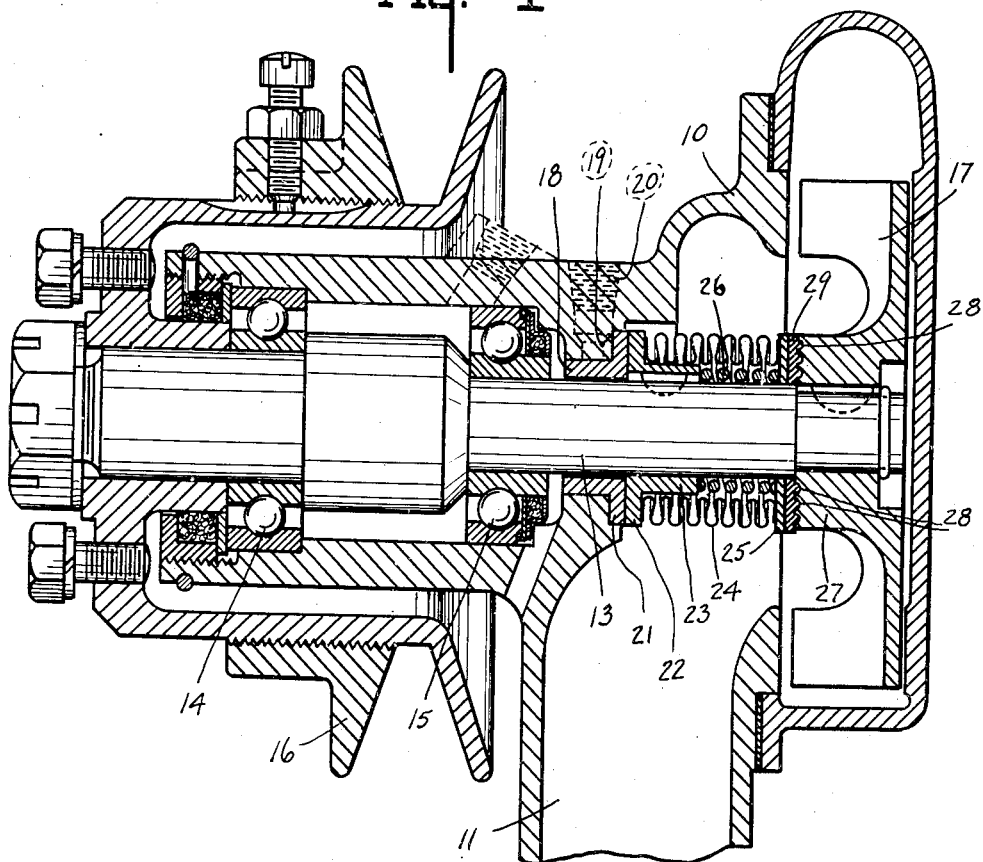
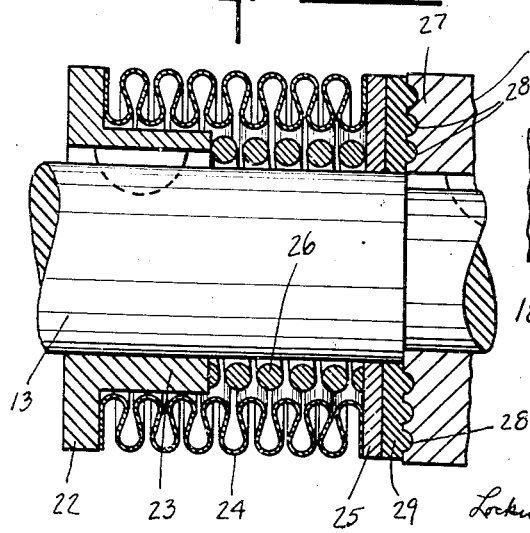
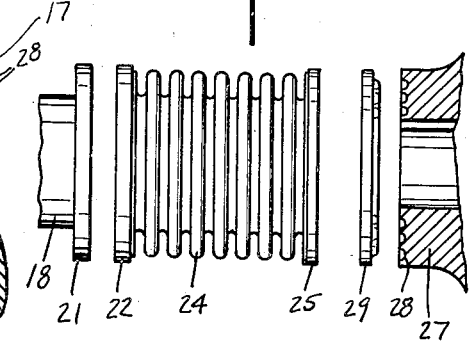
INVENTORS.
LOUIS SCHWITZER.
CARL J. WINKLER.
BY
Lockwood Lockwood Goldsmith & Galt
ATTORNEYS.

Patented Feb. 14, 1933

1,897,280

UNITED STATES PATENT OFFICE

LOUIS SCHWITZER AND CARL J. WINKLER, OF INDIANAPOLIS, INDIANA, ASSIGNORS TO SCHWITZER-CUMMINS COMPANY, OF INDIANAPOLIS, INDIANA, A CORPORATION

SHAFT SEAL

Application filed December 17, 1931. Serial No. 581,574.

This invention relates to a bearing construction particularly adaptable for use in connection with water pumps and the like for preventing the escape of fluid from the pump or entering the bearings, while preventing the escape of lubricant therefrom.

Expansible sleeves in the nature of bellows or the like, and commonly known as "sylphon" have heretofore been used for this purpose, wherein the expansible sleeve surrounding the shaft has had one end thereof soldered or otherwise secured to a sealing ring and the other end thereof similarly secured to the shaft, impeller or other member rotatable therewith. It has been found to be difficult and expensive to thus secure the expansible sleeve to the impeller or the like in addition to making it difficult to assemble or disassemble the same. In addition thereto, the sealing member such as solder or the like has become torn away, broken and otherwise damaged, which thereupon permits leakage.

It is the purpose of this invention to overcome the above noted difficulties, whereby the parts may be readily asembled and disassembled. The expense and difficulty of soldering or otherwise securing the expansible sleeve to the member is avoided and the danger of breakage, leakage or the like eliminated.

The feature of the invention, therefore, resides in the use of such an expansible sleeve or "sylphon" in connection with the bearing, shaft, sealing ring and driven member such as an impeller, by providing the member with a plurality of annular grooves with which a packing ring is associated and adapted to be pressed into said grooves for perfecting a seal therewith. The adjacent end of the expansible sleeve is soldered or similarly secured to a washer which bears against the packing under the inherent spring pressure exerted by the expansible sleeve. Thus, the expansible sleeve and associated parts may be readily separated from the member or impeller, removed or assembled as a unit.

The full nature of the invention will be understood from the accompanying drawing and the following description and claims:

Fig. 1 is a central vertical section through a portion of a pump showing the application of the bearing seal thereto. Fig. 2 is an enlarged section showing the sealing members associated therewith. Fig. 3 is an illustrative view of the several units removed from the shaft.

In the drawing there is shown a portion of a water pump including the support or housing 10 having a discharge passage 11 in which the shaft 13 is rotatably mounted. Said shaft is principally supported by the ball bearings 14 and 15 and is driven by the pulley 16. Keyed to the end of said shaft there is an impeller 17 adapted to be driven thereby. Said shaft extends through and is rotatable in the porous sleeve 18 mounted in the housing 10 in communication with the oil passage 19 closed by the plug 20.

The sleeve 18 is provided with an outwardly extending flange 21 against which the sealing ring 22 is adapted to abut, said sealing ring being keyed to the shaft and having an elongated cylindrical portion 23. Surrounding said cylindrical portion and secured to the surface of the sealing ring by solder or other suitable means, there is a bellows-like expansible sleeve or "sylphon" 24. Said expansible sleeve in collapsed position extends to a point adjacent the impeller 17 and may be secured and sealed by solder or the like to the metal washer 25. Contained within the sleeve and compressed between the portion 23 and the washer 25, there is a compression spring 26 normally tending to extend the sleeve.

The adjacent surface of the hub portion 27 of the impeller 17 is provided with a plurality of annular grooves 28 adapted to receive a packing disk 29 formed of resilient or pliable packing material, such as rubber, cork, or a suitable composition. The tension of the spring 26 and sleeve 24 when compressed is such as to cause the washer 25 to force the packing material into the grooves 28 so as to effect a seal with the impeller, a suitable seal being effected between the abutting surfaces of the washer and packing, all of which rotate together with the shaft 13.

As illustrated in Fig. 3, the sealing members may be formed in a unit, to be assembled and disassembled with the shaft and impeller as such, the unit comprising the expansible sleeve, the spring 26, the sealing ring 22 and washer 25. By means of this arrangement, the impeller may be readily removed from the shaft without affecting the sealing members, said members being removable therefrom as a unit and without disturbing the soldering or like attachment between the expansible sleeve and impeller as heretofore. Likewise, the assembly is correspondingly simplified in that the members of the unit may be soldered or secured together permanently and mounted together on the shaft without the necessity of soldering the sleeve to the impeller.

The invention claimed is:

1. The combination with a housing having a bearing and a shaft supported therein, of a member secured to said shaft having a recess formed in the surface thereof, a resilient packing ring mounted in engagement with said member and extending into said recess, and a sealing unit secured to said shaft for sealing that portion thereof between the said member and housing, said sealing unit including a sealing ring secured to said shaft in sealing engagement with said housing, a second sealing ring in sealing contact with said packing ring, and a flexible extensible metal sleeve permanently secured to said sealing rings and extending therebetween.

2. The combination with a housing having a bearing and a shaft supported therein, of a member secured to said shaft having a recess formed in the surface thereof, a resilient packing ring mounted in engagement with said member and extending into said recess, and a sealing unit secured to said shaft for sealing that portion thereof between the said member and housing, said sealing unit including a sealing ring secured to said shaft in sealing engagement with said housing, a second sealing ring in sealing contact with said packing ring, a flexible extensible metal sleeve permanently secured to said rings and extending therebetween, and a compression spring mounted within said sleeve bearing against the respective sealing rings for forcing them into sealing engagement.

In witness whereof, we have hereunto affixed our signatures.

LOUIS SCHWITZER.
CARL J. WINKLER.